United States Patent

[11] 3,610,449

| [72] | Inventors | Kiyoji Hashimoto;<br>Yorio Harada; Hideo Miki, all of<br>Kurashiki, Japan |
|---|---|---|
| [21] | Appl. No. | 3,825 |
| [22] | Filed | Jan. 19, 1970 |
| [45] | Patented | Oct. 5, 1971 |
| [73] | Assignee | Kurashiki Rayon Co., Ltd.<br>Kurashiki City, Okayama Prefecture,<br>Japan |

[54] APPARATUS FOR TAKING SPUN CAKES OUT OF THE CENTRIFUGAL SPINNING MACHINE
3 Claims, 7 Drawing Figs.

[52] U.S. Cl. .................................................... 214/1 BD,
214/147 T
[51] Int. Cl. ....................................................... B66c 1/54
[50] Field of Search ............................................ 214/1 BD, 1
BV, 147 R, 147 T

[56] References Cited
UNITED STATES PATENTS

| 2,623,774 | 12/1952 | Hubbard | 214/147 X |
| 3,048,281 | 8/1962 | Godfrey | 214/1 B4 |

Primary Examiner—Gerald M. Forlenza
Assistant Examiner—George F. Abraham
Attorney—Christen & Sabol ABSTRACT: Methods of an apparatus for taking a plurality of freshly spun cakes out of the centrifugal spinning machine simultaneously by internally gripping and holding the spun cakes with cake-supporting means for swaying lift, stable carrying and swaying suspension of the cakes. The cake-supporting means has at its one end a stabilizing rod adapted to be slidably inserted into a stabilizing sleeve pivoted to a reverse turn arm so that the cake-supporting means carrying the cake is always stabilized in the vertical direction.

PATENTED OCT 5 1971

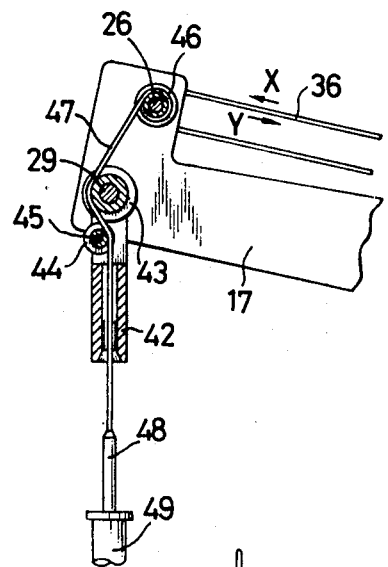
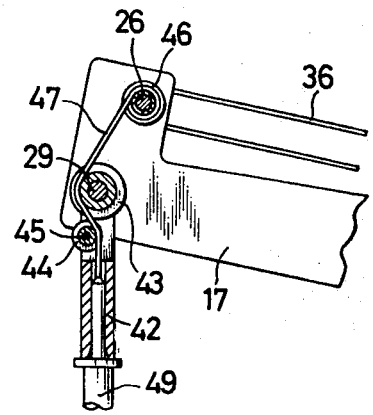
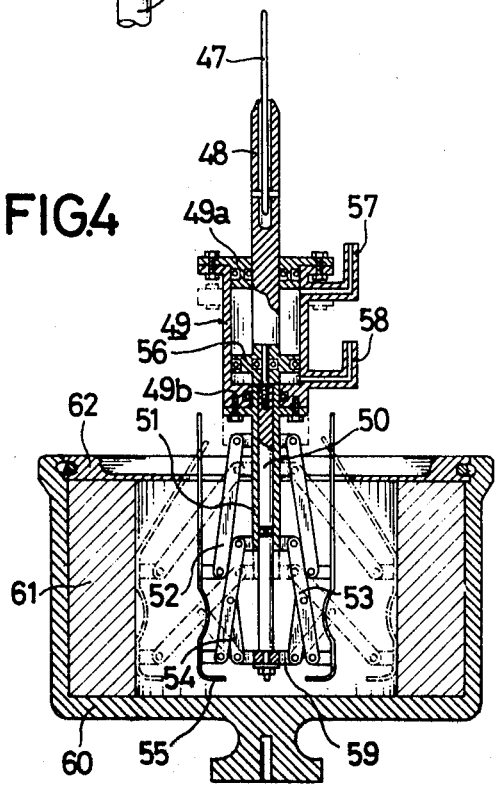
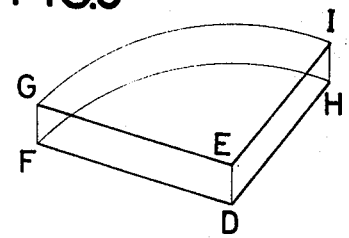
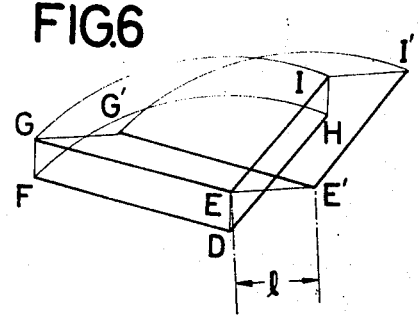

3,610,449

1

APPARATUS FOR TAKING SPUN CAKES OUT OF THE CENTRIFUGAL SPINNING MACHINE

BACKGROUND OF THE INVENTION

This invention relates to methods of and apparatus for taking a plurality of freshly spun cakes out of the centrifugal spinning machine simultaneously in a single operation by internally gripping and holding the spun cakes with the cake-supporting means for swaying lift, stable carrying and swaying suspension of the cakes.

In the usual spinning process, the removal of a full spun cake from a pot of the spinning machine takes place in such a way that the pot accommodating the spun cake is manually taken out of the spinning machine for the detachment of a spring and a pot covering from the pot and then the pot is inverted for the removal of the cake, which necessitates much time for operation and considerable laborious load.

Another conventional apparatus for this purpose comprises an oscillating arm which at its end is pivotably connected to a cake-holding suspension lever through a pin, said suspension lever at its lower end either suspending an inner casing or sleeve so configured as to firmly adhere to an inner circumferential wall of the pot or providing an electromagnet to electrically adsorb the cake takeout disc under the conduction, so that the spun cake formed in the inner casing mounted in the pot or on the cake takeout disc is taken out of the pot together with the inner casing or the cake takeout disc by actuating the turn arm.

Such conventional apparatus, however, provides no vertical carrying mechanism, which makes it quite difficult to separate the spun cake from the pot and rather makes it substantially impossible to reset the inner sleeve into the pot because of its intrinsic construction. Moreover, since the cake-holding suspension lever is loosely fitted to the turn arm, the reverse turn of the turn arm at a high speed provides adversely an undesired pendulum motion of the suspension lever around the said loose fit portion.

Further, the usual manner and the conventional apparatus as have been pointed out previously necessitates the reset of the inner sleeve or the cake takeout disc into the pot, which prolongs the time for operation approximately twice and also a centering of the cake takeout means with the pot requires a relatively high accuracy.

SUMMARY OF THE INVENTION

Therefore, it is a general object of the present invention to obviate any inconvenience and disadvantage in the conventional cake takeout methods and apparatus and to provide new methods of and apparatus for taking a plurality of spun cakes out of the spinning machine simultaneously in a short time and with a minimum laborious load.

A further, more specific object of the present invention is to provide automatic methods of and apparatus for taking the spun cakes out of the pot of the spinning machine with improved efficiency. The apparatus include a cake-stabilizing means comprising a stabilizing rod connected to one end of the cake-holding means and adapted to be slidably inserted into a stabilizing sleeve pivoted to one end of the turn arm.

In summary, the present invention is characterized in that a power cylinder is applied to the cake-holding means, that a belt or wire means is mounted in the vertical actuation region of the apparatus through several rollers and that provision is made of a stabilizing sleeve movable in parallel with a vertical link for preventing the cake on carry from the swaying motion, thereby to increase the turn speed of the reverse arm while to decrease the takeout cycle of the cake from two cycles in the conventional apparatus to one cycle with a remarkable reduction of time for the takeout operation. It will be appreciated from the following description that the apparatus according to the invention is applicable and practicable without any improvement or modification of the conventional spinning machine and its parts or accessories.

Other objects and advantages of the present invention will become apparent as the following description proceeds.

2

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principal of the invention may be employed. In the accompanying drawings:

BRIEF DESCRIPTION OF THE DRAWINGS

FIG. 3a is a fragmentarily enlarged side view in partially sectioned of the turn arm head in the location A of FIG. 1 showing the stabilizing rod of the cake-holding means being separated from the stabilizing sleeve of the reverse arm;

FIG. 3b is a fragmentarily enlarged side view similar to FIG. 3a but showing the stabilizing rod being inserted into the stabilizing sleeve;

FIG. 4 is a fragmentarily enlarged sectional elevation of the cake-holding means;

FIG. 5 is a geometrical diagram illustrative of the actuation of the stabilizing link of the cake-holding means; and FIG. 6 is a geometrical diagram similar to FIG. 5 but also showing the actuation of the stabilizing link of the location shifted in a distance of $l$.

DESCRIPTION OF PREFERRED EMBODIMENT

Figure 1:
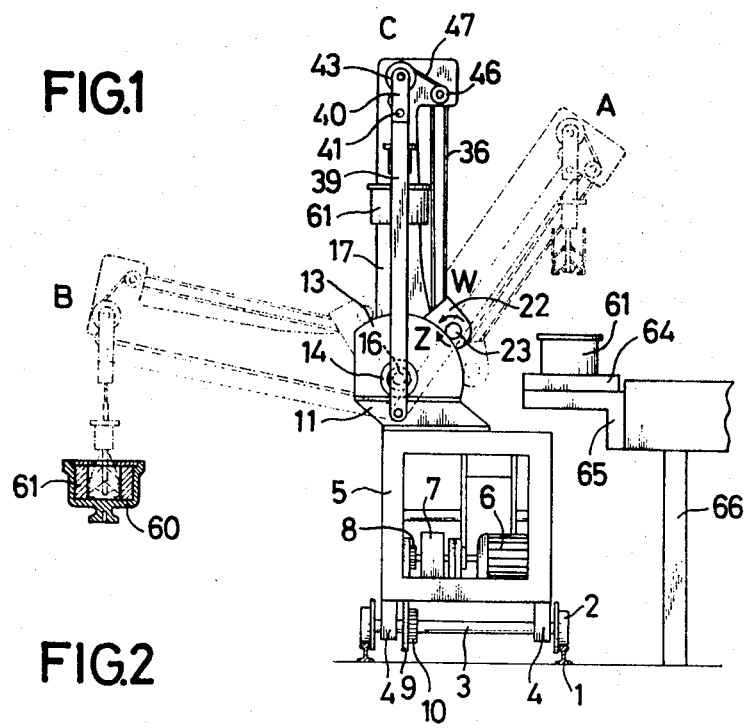
FIG. 1 is a lateral view of the apparatus according to the invention showing a mode of the actuation of the reverse arm suspending the cake-holding means.
Figure 2:
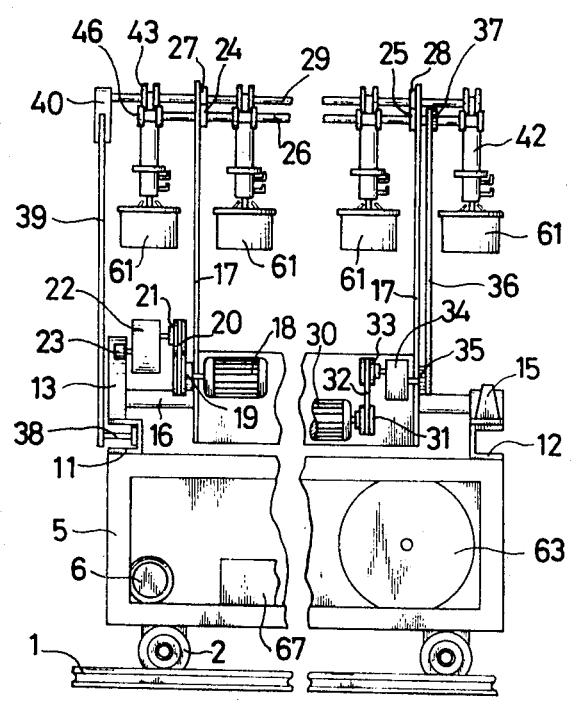
FIG. 2 is a fragmentary elevation of FIG. 1 showing portions of the cake-removing mechanism.

Referring now to FIGS. 1 and 2, environmental view of the apparatus, there is shown rails 1 mounted on a table of the spinning machine, on which a truck 5 is surmounted through symmetrical wheels 2 an axle 3 and opposite bearings 4. The truck 5 accommodates a driving motor 6 mounted therein for running along the rails 1, which rotates the axle 3 through a reduction gear 7, a sprocket 8, a chain 9 and a sprocket 10.

Arranged symmetrically on the opposite top ends of the truck 5 are brackets 11 and 12. As seen in FIG. 2, a bearing 14 accommodated in a gearing 13 on the bracket 11 and a bearing 15 on the bracket 12 bear a reverse shaft 16 in parallel with the table of the spinning machine. To the reverse shaft 16 is fitted a reverse arm 17 on which a driving motor 18 is mounted to reverse the said reverse arm 17.

The gearing 13 is in mesh with a pinion 23 secured to an output axis of the reduction gear through a V-pulley 19, a V-belt 20, a V-pulley 21 and a reduction gear 22.

The reverse arm 17 at its upper end bears pivotably a takeup shaft 26 through bearings 24 and 25 and a stabilizing shaft 29 through bearings 27 and 28, respectively. Further, the reverse arm 17 is associated with a driving motor 30 for rotating a takeup shaft 26 and it will be understood that a motive power is transmitted through a V-pulley 31, a V-belt 32, a V-pulley 33, a reduction gear 34, a sprocket 35 and a chain 36 to a sprocket 37 fitted to the takeup shaft 26. A vertical support link 39 is pivoted at its lower end to a pin 38 fitted to the bracket 11 and linked at its upper end to a vertical link 40 through a pin 41.

As seen in FIGS. 2 and 3a, b in enlarged scale, to the stabilizing shaft 29 bearing the vertical link 40 are fixed a plurality of stabilizing sleeves 42 in the same angular or direction as the vertical link 40. Among the stabilizing shaft 29 and the stabilizing sleeve 42 is rotatably provided a pulley 43 and under the said pulley 43 a guide roller 44 is rotatably fitted to a pin 45. Further, the takeup shaft 26 is provided with takeup drum 46 of the same numbers as the stabilizing sleeves 42.

A wire 47 is affixed at its one end to the takeup drum 46 and extended through the rope pulley 43, the guide roller 44 and the stabilizing sleeve 42 into a slot provided in a stabilizing rod 48.

As seen in FIG. 4, the stabilizing rod 48 is provided with a cake takeout means which is comprised of a cylinder 49, a piston rod 50, a piston rod guide member 51, a link 52, a link 53, a link 54, a cake-holding member 55 and the like. The stabilizing rod 48 is passed through an upper lid of the cylinder 49 across a piston 56 and connected integrally to the piston rod 50.

A cylinder 49 and an upper lid 49a are fitted together by a fastener such as a blot and sealed with the first outer annular ring. The upper lid 49a and the stabilizing rod 48 are sealed with the first inner annular ring. The cylinder 49 and the piston 56 are sealed with the second outer annular ring. The stabilizing rod 48 and the piston 56 are sealed with the second inner annular ring. Moreover, the cylinder end 49b and the flanged-piston rod guide member 51 are fixed with each other by a fastener such as a bolt and sealed with the third annular ring. The flanged-piston rod guide member 51 and the piston rod 50 are sealed with the fourth annular ring.

The cylinder 49 at its upper and lower sides are provided with fluid inlets 57 and 58 so that the reciprocal motion of the cylinder 49 may be effectuated by a compressed air supply through the said fluid inlets 57 and 58.

The piston rod 50 at its lower terminal end is fixed with a link frame 59 by a fastener such as nut through a washer. The link frame 59 and a link 54, the link 54 and a link 53, the link 53 and the piston rod guide member 51 or the cake-holding member 55, a link 52 and the piston rod guide member 51 or the cake-holding member 55 are linked respectively through the corresponding pins.

The cake-holding member 55 at is upper region above the location linked to the link 52 through a pin is preferably formed of such pliable material as sheet metal or synthetic resin so that the member 55 when expanded within a pot 60 grips and holds internally a spun cake 61 with its main region, while the upper cover of the member 55 is collided to an opening rim of a pot cover 62 to have the member 55 bent as shown in FIG. 4 by dotted lines, whereby the said pot cover 62 being held by the upper end of the member 55 under the influence of the elastic force of the bent member 55.

In FIG. 2, the truck 5 accommodates a cord reel 63 for supplying an electric power to the driving motors 6, 18 and 30.

As seen in FIG. 1, at one end of the truck 5 remote from the spinning machine, there is provided a cake receptacle 64 supported by a bracket 65 and a support member 66. The reference numeral 67 designates a compressor.

In the operation of the apparatus according to the invention, after the formation of the spun cake 61 in the pot 60 within the predetermined period, the driving motor 18 is started to rotate the pinion 23 to the direction of an arrow W. As has been pointed out previously, the pinion 23 coacts with the gearing 13 which is fitted to the bracket 11. Thus, the pinion 23 revolves radially with its self-rotation around the reverse shaft 16 to the counterclockwise direction entailing the same counterclockwise turn of the reverse arm 17 integrally associated with the reduction gear 22.

When the reverse arm 17 turns from the location A wherein the cake 61 is placed on the receptacle 64 to the location B, the actuation of the driving motor is interrupted. Subsequently, the driving motor 30 is started to turn the chain 36 in the direction of an arrow X as shown in FIGS. 3 and 4 through a reduction gear 34 and the like so that the wire 47 wound around the takeup drum 46 is relaxed. Thus, the stabilizing rod 48 coupled into the stabilizing sleeve 42 comes out as shown in FIG. 3a.

Further, when the cake-holding member 55 comes into the spun cake 61 accommodated in the pot 60, the actuation of the driving motor 30 is interrupted with the cessation of the compressed air supply from the fluid inlet 57. When the compressed air is supplied through the fluid inlet 58 into the cylinder 49, the said cylinder 49 is depressed downwardly since the piston 56 is fixed to the stabilizing rod 48 so that the cake-holding member 55 secured to the piston rod guide member 51 and the piston rod 50 through the links 52, 53 and 54 is expanded laterally to grip and hold the inner circumferential wall of the cake internally. Thereafter, the driving motor 30 is subjected to a reverse revolution to turn the chain 36 in the direction of an arrow Y for winding the wire 47 on the takeup drum 46, so that that the stabilizing rod 48 is shifted from the situation of FIG. 3a to that of FIG. 3b to cease the actuation of the driving motor 30.

By this operation, the cake 61 is lifted vertically while being internally held by the cake-holding member 55 and thus perfectly separated from the pot 60. Immediately after the cessation of the driving motor 30, the driving motor 18 is reversed to rotate the pinion 23 in the clockwise direction Z as seen in FIG. 1. Then, the reverse arm 17 also turns in the clockwise direction from the location B through the location C to the location A whereon the driving motor 18 stops. Then, the driving motor 30 is once again started to turn the chain 36 in direction of the arrow X, so that the wire 47 is relaxed and the cake 61 at its bottom end is made into contact with an upper surface of the cake receptacle 64 to cease the actuation of the driving motor 30, whereby a further supply of the compressed air into the fluid inlet 58 is intercepted. On the other hand, the compressed air is supplied from the fluid inlet 57 into the cylinder 49, so that the cake-holding member 55 is retracted laterally and separated from the inner wall of the cake 61. After the termination of the preceding actuation, the driving motor 30 is further reversed to turn the chain 36 in the direction of the arrow Y as seen in FIG. 3a to wind the wire 47 on the takeup drum 46 and the driving motor 30 is stopped when the stabilizing rod 48 comes to the situation shown in FIG. 3b which corresponds to the location A depicted in FIG. 1.

As will be appreciated from the disclosure, the foregoing operations constitute one step for embodying the present method and thus the cake takeout operation may be carried out in series by use of the driving motor 6 for moving along the rails. Further, the location of the apparatus may be automatically determined by provision of several attachments (not shown) to the rails per desired pitches.

It will now be clear that the characteristic feature of the present invention resides in that despite any high speed turn of the reverse arm 17 or even its abrupt cessation, the stabilizing sleeve 42 is always held vertically. That is, during the stabilizing rod 48 being coupled into the stabilizing sleeve 42 as shown in FIG. 3b, the cake holder is free from any swaying motion and always held vertically and stabilized despite the high speed turn of the reverse arm 17 or its abrupt cessation.

Further, according to the invention use is made of the power cylinder for the cake-takeout means and the cake-holding member is so constructed as to expand laterally in response to the reciprocal motion of the cylinder, so that the inner wall of the spun cake is always kept in a good alignment and also the cake-holding motion is stabilized on account of the lower fulcrum of the cake-holding member.

FIGS. 5 and 6 depict the typical modes of operations of the stabilizing link of the cake-holding means according to the invention.

As seen in FIG. 5, the point D is a center of the pin 38 pivoted to the vertical support link 39, the point E stands for a center of the reverse shaft 16. Further, the points F and H show a center of the screw 41 pivoted to the vertical support link 39 and the vertical link 40, while G and I are intersecting points of the vertical link 40 with the stabilizing shaft 29.

It will be understood that GE, FD and GF, ED, provided as being equivalent, form a parallelogram. Thus, as far as ED is perpendicular to the floor, GF or IH always possesses a vertical characteristic. As seen in FIG. 6, there is no substantial geometrical change in the same vertical characteristic of the vertical link 40 even if the turning locations of the vertical support link 39 and the reverse arm 17 are displaced in parallel in a distance of $l$.

As has been pointed out previously, since the stabilizing sleeve 42 and the vertical link 40 are fixed to the stabilizing shaft 29, the stabilizing sleeve is always kept in vertical like the vertical link.

Although the meshing connection of the gearing with the pinion is utilized as a preferred manner to turn the reverse arm 17 for the purpose of the description, a worm gear may be alternatively applied to the reverse shaft with a worm attached to the body or an outlet shaft may be directly connected to the reverse shaft.

While certain preferred embodiments of the invention have been illustrated by way of example in the drawings and particularly described, it will be understood that various modifications may be made in the apparatus and constructions and that the invention is no way limited to the embodiments shown.

What is claimed is:

1. An apparatus for taking a spun cake out of the centrifugal spinning machine, which comprises a reverse shaft provided on a truck movable in parallel with a table of the spinning machine, a reverse arm pivoted to the reverse shaft, a stabilizing sleeve pivotably fitted to the reverse arm, means connected with said sleeve to maintain it in a vertical position independent of turning of the reverse arm and a cake-holding means possessing a stabilizing rod adapted to coact with the stabilizing sleeve and connected to one end of a wire extending from a takeup drum on the reverse arm through the stabilizing sleeve.

2. An apparatus according to claim 1, wherein the cake-holding means comprises a cylinder providing at its upper end an opening for the stabilizing rod and at its lower end a protruded-piston rod guide, a piston secured at its upper end to the stabilizing rod and at its lower end to a piston rod and mounted in the cylinder, the said piston rod guide being provided with a plurality of cake-holding members through upper and lower symmetrical links and of the same length, while the piston rod at its terminal end being provided with a link which is in turn linked with the lower links, whereby the cake-holding members expanding laterally in response to the reciprocal motion of the cylinder.

3. An apparatus according to claim 2, wherein each of the cake-holding members at its upper half preferably above the location of its connection to said links is formed of pliable material such as sheet metal or synthetic resin, whereby the cake-holding member holding internally at is main region a spun cake and at is upper portion a pot cover.